Patented May 20, 1941

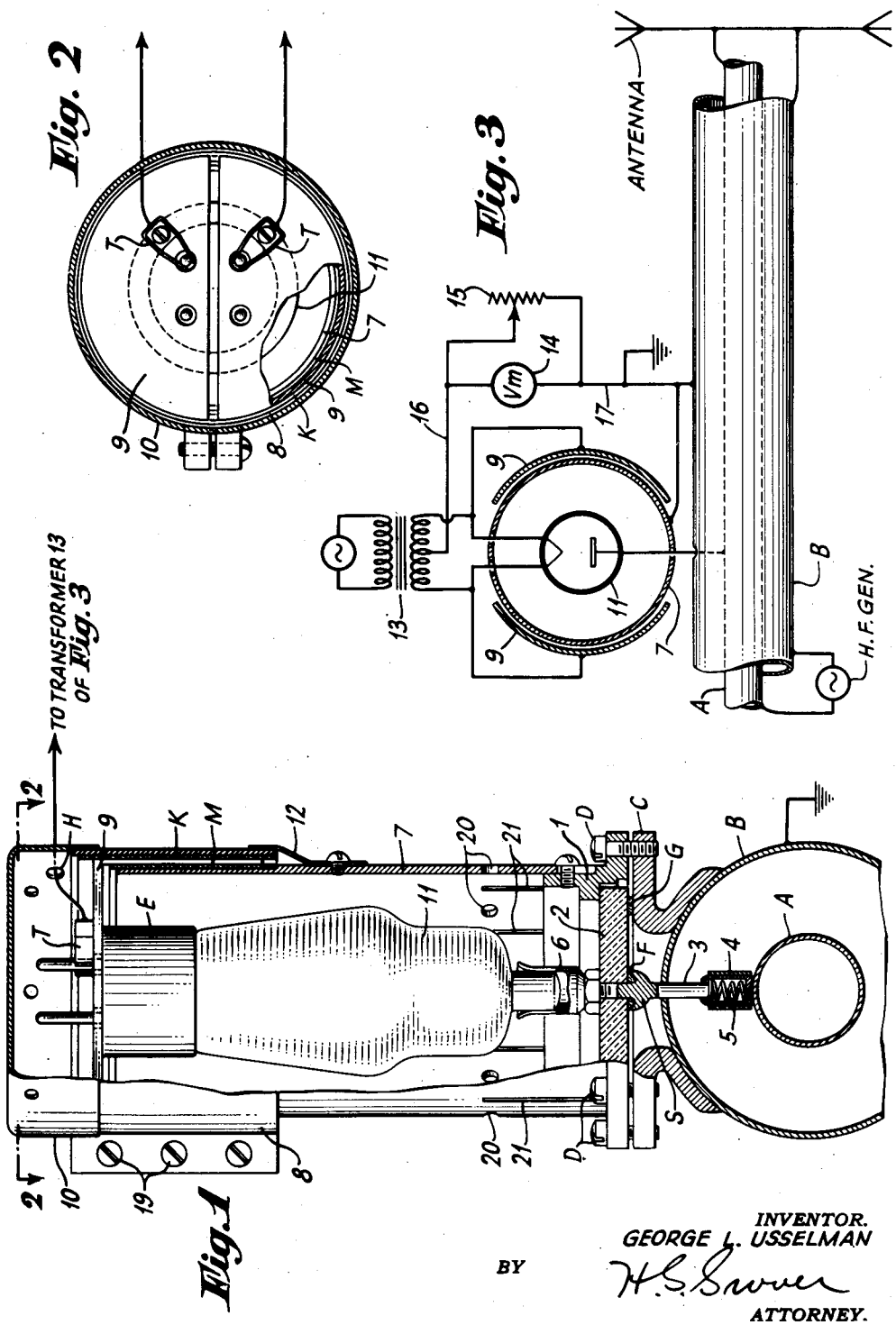

2,242,874

UNITED STATES PATENT OFFICE 2,242,874

ENERGY MEASURING SYSTEM

George L. Usselman, Port Jefferson, N. Y., assignor to Radio Corporation of America, a corporation of Delaware Application January 12, 1940, Serial No. 313,509

13 Claims. (Cl. 175—183)

The present invention relates to improvements in vacuum tube voltmeters.

An object of the present invention is to provide an improved vacuum tube voltmeter particularly adapted for measuring the peak voltage on a coaxial transmission line.

In brief, the improved vacuum tube voltmeter of the invention comprises a shielded vacuum tube rectifier mounted on a support having a probe inserted into the coaxial line whose peak voltage is to be measured. The support and probe are permanently mounted on the coaxial line and are so designed that there is a fluid tight mechanical and electrical connection between the outer conductor of the line and the support for the vacuum tube rectifier to prevent fluid leakage from those coaxial lines which have the space between conductors filled with a compressed fluid or gas. An easily removable shield surrounds the vacuum tube rectifier for preventing radiation of the transmission line energy and for safeguarding the operator from accidental contact with the high voltage on the line.

A more detailed description of the invention follows in conjunction with a drawing wherein:

Fig. 1 illustrates a side view, partly in section and partly in elevation, of the vacuum tube voltmeter of the invention in combination with the coaxial line whose voltage is to be measured;

Fig. 2 is a sectional view of Fig. 1 taken along the line 2—2 in the direction of the arrows indicated; and Fig. 3 is a simplified circuit showing the manner in which the voltmeter of the invention is connected to its associated elements.

Referring more particularly to Fig. 1, there is shown a coaxial transmission line A, B carrying energy on the inner conductor A and whose peak voltage it is desired to measure. Mounted on the outer conductor B of this coaxial line and supported thereby is a shielded vacuum tube rectifier 11, whose anode is electrically connected to a probe 3 inserted into the interior of the coaxial line through a suitable aperture in the outer conductor and contacting the inner conductor A.

The aperture in the outer conductor B through which probe 3 extends is approximately one inch in diameter. Around this aperture and externally of the outer conductor is a flanged part C which is soldered to the outer conductor. A flanged ring clamp 1 is fastened to flange C by means of screws D. The inner surface of the ring clamp 1 is provided with an overhanging edge, as shown, which seals a disc insulator 2 to the coaxial line with the aid of a gasket G. A metal probe or contact stud 3 is fastened through the center of disc insulator 2. This probe or stud is provided with a shoulder S which cooperates with another gasket F to make the joint between the disc 2 and the probe 3 airtight. The lower end of stud 3 is fitted with a metal cap 4 and spring 5 to insure good electrical contact or connection to inner conductor A of the transmission line. The cap 4 is also fitted with a slidable sleeve, as shown, to adapt this equipment for use on lines having smaller inner conductors. The upper end of stud 3 is fitted with a clip or socket 6 for the anode terminal of a vacuum tube rectifier 11.

Vacuum tube rectifier 11 is surrounded by a cylindrical metal shield 7 for substantially its entire length. Cooperating with shield 7 to form a support for the base E of the vacuum tube 11 are two semi-cylindrical metal parts 9, 9 which provide prong clips for the filament prongs of the vacuum tube. These semi-cylindrical parts 9, 9 are also equipped with terminal connections T, T (note Fig. 2) and are insulated from shield 7 by means of the mica insulating dielectric. Surrounding the parts 9, 9 and insulated therefrom by mica insulating dielectric K is a slotted cylindrically shaped metal clamp 8 which is tightened by means of screws 19. A metal cap 10 completes the shield for the rectifier and encloses the filament prongs of the rectifier. This cap 10 is seated on a shoulder provided by clamp 8 thus fitting over the upper end of 8, and is provided with suitable holes H for permitting the filament heating leads to enter the interior of the shield.

Each of the semi-cylindrical metal parts 9, 9 is connected to one filament prong of the rectifier, and forms a condenser with elements 7 and 8 from which it is insulated by the mica dielectric spacers M and K. Mica insulators M and K overlap the lower ends of parts 9, 9 in order to prevent the high voltage current from arcing across the edges of the insulation and the metal parts of the condenser. Elements 7 and 8 are directly connected together by strap 12, and because they are directly connected to the outer conductor B of the coaxial line which is usually grounded, the filaments are capacitively coupled to ground or by-passed, so to speak, for energy of the operating radio frequency. Although the filament condensers 7, 8, 9 have low impedance for radio frequency energy, it will be appreciated, of course, that they have very high impedance for direct current.

Vacuum tube 11 is thus completely shielded so that no energy can radiate from the line and only the rectified current which is very small is used to operate the voltmeter and supply the insulation leakage. It may be observed that the two halves 9, 9 perform the dual function of the tube socket (with filament connections) and filament to ground by-pass condenser. The upper and lower rows of holes 20 provide ventilation for the tube and the slots 21 in the lower end of 7 provide a free sliding fit and good contact between the shield 7 and ring 1.

A connection screw is provided in the top of each of the halves 9 for connecting the tube filaments to the well insulated secondary winding of filament heating transformer 13. (Note Fig. 3.) The primary windings of this transformer 13 may be connected to a suitable source of alternating current, as shown. The center tap of the filament transformer secondary winding is connected through lead 16 to a low current (high resistance) direct current voltmeter 14. It is preferred that this voltmeter 14 be an electrostatic voltmeter which uses no current at all. The other terminal of the voltmeter 14 is connected through lead 17 to the shield 7 or to the outer conductor of the transmission line which is usually at ground potential. The resistance 15 may represent the circuit current leakage to ground or it may be supplied and be connected across the voltmeter circuit as shown to more quickly discharge the filament by-pass condenser when the line power is shut off. This resistance has a very high value for reason which appear later.

The operation of the vacuum tube voltmeter may be understood not only by reference to Fig. 1 but also by reference to the simplified equivalent circuit diagram of Fig. 3 wherein the same reference characters have been used as in Fig. 1 to designate like or equivalent parts. The vacuum tube 11 constitutes a half wave rectifier so that a small part of every alternate half cycle of the alternating current wave in the transmission line A—B is rectified. This requires that there be a low resistance direct current path or circuit between the inner and the outer conductors of the coaxial transmission lines in order to complete the vacuum tube voltmeter circuit for direct current. Usually at the transmitter or at the antenna the two lines are connected together for other purposes and incidentally form a direct current path. By this means the filament by-pass condenser 7, 8, 9 is charged up. If the load or leakage rectified current is very small, the by-pass condenser will be maintained at substantially peak transmission line voltage. The voltmeter 14 indicates this peak voltage. In a model tried out in practice, there was employed an electrostatic voltmeter 14 which requires no current to operate it. The resistance 15 may be made very high (10,000,000 ohms) or it may be omitted altogether so that only insulation leakage current must be supplied by the rectifier. When an electrostatic voltmeter is used, substantially true peak transmission line voltage is indicated by meter 14.

If a direct current voltmeter requiring appreciable current be used, then since rectifier tube 11 is of the high vacuum type having comparatively high resistance, meter 14 would not in this case indicate true peak voltage. It would indicate a voltage below true peak voltage, the error being greater in proportion to the amount of current required by the meter and other attached load. Because of the high frequency and high line voltage on which this vacuum tube voltmeter is required to operate, in this case, a high vacuum type of diode rectifier tube should be used. When the line voltage to be measured is high then this tube must also be able to withstand high peak inverse voltages which would be two times the highest peak voltage measured. Transformer 13 should have sufficient secondary winding insulation to withstand the highest peak voltage measured and at the same time have very small leakage current to ground. When the vacuum tube voltmeter is required to measure peak voltages of ultra high frequency transmission line current then a rectifier tube should be chosen having a minimum spacing or distance between cathode and anode which is also able to withstand the maximum peak inverse voltages to which it will be subjected. This close spacing of tube elements is desirable to cut down the error in measurements due to the time required for electrons to travel between cathode and anode. In very high frequencies, above 50,000,000 cycles per second, this error can be five percent and more. It is also desirable for this diode rectifier tube to have small interelectrode and other ground capacity in order not to produce too much reflection in the transmission line on which the measurements are being taken. Any appreciable lumped capacity or inductance or low resistance shunted across the line will cause objectionable reflections of current and voltage.

One of the many advantages of the present invention is that the vacuum tube rectifier is easily removable for renewal purposes without disturbing the airtight joint between the coaxial transmission line and the vacuum tube support.

Another advantage of the invention is that there is provided a construction which substantially perfectly shields the vacuum tube and thus prevents the escape of any radiation of the transmission line energy which might otherwise cause undesirable effects.

By means of the present invention, particularly when used with an electrostatic voltmeter, there is obtainable an increased degree of accuracy in voltage measurement not easily obtainable in prior structures.

In practice it may be desirable to employ one electrostatic voltmeter 14 and one filament transformer 13 for several vacuum tube rectifier units. For this purpose a switch, such as a two pole switch having several positions, may be installed between the rectifier tube 11 and the filament transformer. In an installation constructed and successfully operated, there has been employed a two pole switch having as many as six positions for switching a single filament transformer into use with any one of five rectifiers. Of course, more than one electrostatic voltmeter may be employed in such a switching scheme to accommodate different rectifier units.

What is claimed is:

1. In an energy measuring system, in combination, a coaxial line carrying energy whose value is to be measured, a vacuum tube, and a support for said vacuum tube mounted on the outer conductor of said line, said support providing an airtight electrical connection between said vacuum tube and the interior of said line.

2. In a voltage measuring system, in combination, a coaxial line carrying energy whose peak voltage is to be measured, a vacuum tube rectifier, and a support for said vacuum tube mounted on the outer conductor of said line and providing an airtight electrical connection between said vacuum tube and the interior of said line, said support containing a probe extending through an aperture in the outer conductor of said line and contacting the inner conductor of said line.

3. A system in accordance with claim 2, including an electrostatic voltmeter connected between the filament of said vacuum tube rectifier and the outer conductor of said line.

4. A system for measuring the voltage on a two-conductor transmission line, comprising a vacuum tube rectifier having an anode and a filament, a direct conductive connection from the anode of said rectifier to one conductor of said line, a capacitive connection of low impedance for energy of the operating frequency from each leg of the filament of said rectifier to the other conductor of said line, an electrostatic voltmeter connected between said filament and said last conductor of said line, and a direct current connection between the conductors of said transmission line.

5. A system for measuring the voltage on a two-conductor transmission line, comprising a vacuum tube rectifier, a direct conductive connection from the anode of said rectifier to one conductor of said line, a capacitive connection from each leg of the filament of said rectifier to the other conductor of said line, an electrostatic voltmeter connected between said filament and said last conductor of said line, and a connection of low direct current resistance between the two conductors of said transmission line.

6. In a measuring system, a coaxial transmission line carrying high frequency energy to be measured, a vacuum tube, a support for said vacuum tube mounted on the outer conductor of said line and providing an electrical connection between said vacuum tube and the interior of said line, said support including a hollow metallic shield surrounding said vacuum tube and in direct conductive engagement with the outer conductor of said line, a metallic element mounted on said shield but insulated therefrom to form therewith a by-pass condenser, said last element also constituting at least part of a socket for said vacuum tube.

7. A system in accordance with claim 6, characterized in this that said metallic element is located at the top of said shield and is provided with a metal cover insulated from said element but directly connected to said shield.

8. In an energy measuring system, in combination, a coaxial line carrying energy whose value is to be measured, a vacuum tube, and a support for said vacuum tube mounted on the outer conductor of said line and providing an airtight electrical connection between said vacuum tube and the interior of said line, said support including a removable shield surrounding said vacuum tube, said shield being removable without disturbing the airtight connection between said line and said vacuum tube.

9. A peak voltage measuring system, in combination, a coaxial transmission line carrying energy whose peak voltage is to be measured, a vacuum tube rectifier, a flange fastened to the outside of the said line and supporting a probe extending through a hole in the outer conductor of said line, said flange surrounding said hole, means including a gasket for preventing the escape of fluid in said line through said hole, and means mounted on said flange for supporting said vacuum tube rectifier.

10. A peak voltage measuring system, in combination, a coaxial transmission line carrying energy whose peak voltage is to be measured, a vacuum tube rectifier, a flange fastened to the outside of the said line and supporting a probe extending through a hole in the outer conductor of said line, said flange surrounding said hole, means including a gasket for preventing the escape of fluid in said line through said hole, and a hollow shield mounted on said flange for accommodating said vacuum tube in the interior of said shield, said shield being in direct conductive contact with said flange and said outer conductor.

11. In an energy measuring system, in combination, a coaxial line carrying energy whose value is to be measured, a vacuum tube, and a support for said vacuum tube mounted on the outer conductor of said line and providing an airtight electrical connection between said vacuum tube and the interior of said line, said support including a removable shield surrounding said vacuum tube, said shield being removable without disturbing the airtight connection between said line and said vacuum tube, a source of high frequency energy coupled to the conductors of said coaxial line, and a low resistance direct current path connected between the conductors of said coaxial line.

12. In an energy measuring system, in combination, a coaxial line carrying energy whose value is to be measured, a vacuum tube, and a support for said vacuum tube mounted on the outer conductor of said line and providing an airtight electrical connection between said vacuum tube and the interior of said line, said support including a removable shield surrounding said vacuum tube, said shield being removable without disturbing the airtight connection between said line and said vacuum tube, a connection from the outer conductor of said line to ground, a source of high frequency energy coupled to the conductors of said line at one end, and a load at the other end of said line constituting a path of low resistance to direct current between the conductors of said line.

13. A peak voltage measuring system having, in combination, a coaxial transmission line carrying energy whose peak voltage is to be measured, a vacuum tube rectifier having an anode and a filament, a flange fastened to the outside of the said line and supporting a probe extending through a hole in the outer conductor of said line, said flange surrounding said hole, means including a gasket for preventing the escape of fluid in said line through said hole, said probe being provided with a clip located externally of said line for electrical connection with the anode of said vacuum tube rectifier, and a shield mounted on said flange and electrically connected thereto for shielding said rectifier, said shield including elements which capacitively couple the filament of said rectifier thereto for energy of the operating frequency.

GEORGE L. USSELMAN.